(12) United States Patent
Gokan Khan et al.

(10) Patent No.: US 11,962,474 B2
(45) Date of Patent: Apr. 16, 2024

(54) PERFORMANCE MODELING FOR CLOUD APPLICATIONS

(71) Applicant: Telefonaktiebolaget LM Ericsson (PUBL), Stockholm (SE)

(72) Inventors: Michel Gokan Khan, Karlstad (SE); Wenfeng Hu, Täby (SE); Carolyn Cartwright, Stockholm (SE); Huiyuan Wang, Saint-Laurent (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/765,479

(22) PCT Filed: Oct. 2, 2019

(86) PCT No.: PCT/EP2019/076760
§ 371 (c)(1),
(2) Date: Mar. 31, 2022

(87) PCT Pub. No.: WO2021/063502
PCT Pub. Date: Apr. 8, 2021

(65) Prior Publication Data
US 2022/0385542 A1 Dec. 1, 2022

(51) Int. Cl.
*H04L 41/14* (2022.01)
*H04L 41/0816* (2022.01)
(Continued)

(52) U.S. Cl.
CPC ........ *H04L 41/145* (2013.01); *H04L 41/0816* (2013.01); *H04L 41/5006* (2013.01); *H04L 41/5009* (2013.01); *H04L 43/50* (2013.01)

(58) Field of Classification Search
CPC ............... H04L 41/145; H04L 41/0816; H04L 41/5006; H04L 41/5009; H04L 43/50;
(Continued)

(56) References Cited

U.S. PATENT DOCUMENTS

| 2008/0222646 A1* | 9/2008 | Sigal | G06F 9/505 |
| | | | 718/105 |
| 2015/0009826 A1* | 1/2015 | Ma | H04W 72/569 |
| | | | 370/235 |

(Continued)

OTHER PUBLICATIONS

Javid Taheri et al., vmBBThrPred: A Black-Box Throughput Predictor for Virtual Machines in Cloud Environments, 5th European Conference on Service-Oriented and Cloud Computing (ESOCC)—Sep. 2016.
(Continued)

*Primary Examiner* — John A Follansbee
*Assistant Examiner* — Fadi Haj Said
(74) *Attorney, Agent, or Firm* — Baker Botts L.L.P.

(57) ABSTRACT

A method (1000) for performance modeling of a plurality of microservices (215) includes deploying the plurality of microservices (215) within a network (1260). The plurality of microservices (215) are communicatively coupled to generate at least one service chain (310) for providing at least one service. Based on a resource allocation configuration, an initial set of training data for the plurality of microservices within the network (1260) is determined. At least a portion of data is excluded from the initial set of training data to generate a subset of training data. A Quality of Service (QoS) behaviour model is generated based on the subset of the training data.

19 Claims, 15 Drawing Sheets

(51) Int. Cl.
*H04L 41/5006* (2022.01)
*H04L 41/5009* (2022.01)
*H04L 43/50* (2022.01)

(58) Field of Classification Search
CPC . H04L 41/0895; H04L 41/40; H04L 41/0806; H04L 41/16
See application file for complete search history.

(56) References Cited

U.S. PATENT DOCUMENTS

| | | | |
|---|---|---|---|
| 2018/0069749 A1 | 3/2018 | Singhal et al. | |
| 2018/0352025 A1 | 12/2018 | Anya et al. | |
| 2019/0280918 A1* | 9/2019 | Hermoni | H04L 41/069 |
| 2020/0371893 A1* | 11/2020 | Bhorkar | H04L 43/0852 |

OTHER PUBLICATIONS

PCT International Search Report issued for International application No. PCT/EP2019/076760—dated May 29, 2020.
Manuel Peuster and Holger Karl, Understand Your Chains and Keep Your Deadlines: Introducing Time-constrained Profiling for NFV, 14th International Conference on Network and Service Management (CNSM 2018)—Mini Conference—2018.
PCT Written Opinion of the International Searching Authority issued for International application No. PCT/EP2019/076760—dated May 29, 2020.

* cited by examiner

PERFORMANCE MODELING FOR CLOUD APPLICATIONS

PRIORITY

This nonprovisional application is a U.S. National Stage Filing under 35 U.S.C. § 371 of International Patent Application Serial No. PCT/EP2019/076760 filed Oct. 2, 2019 and entitled "Performance Modeling for Cloud Applications", which is hereby incorporated by reference in its entirety.

TECHNICAL FIELD

The present disclosure relates, in general, to wireless communications and, more particularly, systems and methods for performance modeling of a plurality of microservices.

BACKGROUND

One of the main promises of the next-generation 5G networks is to preserve consistent Quality of Experience (QoE) while decreasing end-to-end latency. Simultaneously, Mobile Network Operators (MNOs) need to lower their Capital and Operational Expenses (CapEx and OpEx). To achieve these goals, the telecommunication industry has adopted virtualization technology to modularize and decouple network functions from other network functions and from specialized proprietary hardware.

Concurrently, container-based cloud native technologies, as a more lightweight solution to virtualization, has developed with the goal to maintain at least the same level of performance and isolation as virtualization provides, if not better. To mitigate several performance and stability challenges exposed by such a transformation, several optimization solutions have been developed to both reactively and predicatively respond to different traffic demand situations leading big data-driven intelligent agents that can manage resource allocation, routing, and mobility of network functions.

However, there exist certain challenges. For example, the extra-granularity of cloud-native applications increases the uncertainty about initial resource allocation configuration of each microservice, which can also be named as resource footprint configuration. If kept uncharted, it imposes multitudinous scaling operations and dramatically decreases Meantime Between Failure (MTBF) of microservices. FIG. 1 illustrates example Service Level Agreement (SLA) violations and scaling operations when resource requirements are too small or too big. More specifically, FIG. 1 demonstrates SLA violations over time as a result of uncharted resource requirements of a set of microservices in a 5G Cloud-native Network Function (CNF). FIG. 1 also shows the corresponding scaling operations (both scale-ups and scale-downs) to heal the failures in the Network Function Cloudification (NFC) system. FIG. 1 shows a relatively high failure rate or a relatively low MTBF as a result of wrong or no minimum resource requirements.

As another example, another challenge with CNFs, like Virtual Network Functions (VNFs), is the extra flexibility of placing them in the network: where to deploy Network Functions (NFs) in the network such that the total cost of system deployment is minimized and also users agreed QoS level assured.

Moreover, a telecommunications network is a complex system to configure. Each network node has many configuration parameters whose optimal values can change depending on many things including its geographical location, traffic load, and traffic types. It is even more difficult to optimize configuration for a CNF where each CNF contains many separately configurable microservices. The sheer number of combinations of configuration parameters of the microservices in the system makes it difficult for a human to configure the system in an optimal way.

Perhaps with smaller systems, obtaining an optimal initial configuration may be unnecessary. With their granularity and faster boot-up times, cloud-native microservices are very fluid and scalable. Simple threshold-based auto-scalers like Kubernetes' Horizontal Pod Autoscaler (HPA) or Elasticdocker can guarantee fair elasticity for most applications. However, auto-scaling leads to other problems like maintaining agreed QoS constraints while preventing multitudinous scale-up and scale-down actions as traffic demands change. A thorough understanding each microservice's resource usage characteristics and the system's dynamics from the beginning has utmost importance for maintaining a consistent QoE.

The Kubernetes Vertical Pod Autoscaler (VPA) Recommender is an attempt to solve this. It can be used to gather metrics from Prometheus and make pod-level generic resource limit recommendations for watched pods based on each pod's historical resource usage data. However, this solution is too generic and does not consider the interaction between microservices within a pod, nor the traffic model supported by the network function.

There have also been a proposal to produce a polynomial model to relate resource utilization of a virtual machine (VM) to its throughput. This technique uses a measure of how sensitive the VM is to different resources and how it behaves under resource contention to decide where to place the VM with respect to other VMs in an optimal way. However, this solution does not consider minimum resource requirements or application-level metrics.

Static tools and testing are available to minimize the guessing involved in how configuration parameters interact within a network node and how their values are affected by the presence or absence and performance of different microservices or other network nodes. However, it takes a significant amount of time and resources. There is a need to avoid these costs by obtaining the optimal initial configuration for a network node quickly without extensive testing. The need is even greater with the additional complexity of deploying the multiple microservices of a CNF in the network.

In conclusion, some shortcomings of existing solutions include the fact that there is no automated solution/framework in the industry or academia that extracts the QoS behaviour model of microservices in the cloud to recommend an initial resource footprint configuration on a given network and keep correcting its errors afterwards. Similar solutions only work on a specific problem by providing a tailor-made approach. These solutions use a static set of metrics and do not consider user-level SLAs. The solutions also have limitations on the number of resource types such as, for example, only considering a static set of flavors in their evaluations (e.g. Amazon flavors). Additionally, existing solutions lack a solution to place and allocate resources to each microservice in a CNF. Finally, none of the previously proposed solutions provide a way to minimize the benchmarking need to create a machine learning model needed to recommend the initial resource allocation configuration.

SUMMARY

To address the foregoing problems with existing solutions, disclosed is systems and methods for model-based resource recommendation for cloud applications. For example, certain embodiments include comprehensive, automated and model-based solutions for modeling cloud-native applications such as NFC systems QoS metrics behaviour corresponding to its microservices resource allocation configuration. Such models may be used to recommend a configurable, predictive resource capacity and replication size for all microservices on a given substrate production network for each user.

According to certain embodiments, a method for performance modeling of microservices includes deploying the microservices within a network such that the microservices are communicatively coupled to generate at least one service chain for providing at least one service. Based on a resource allocation configuration, an initial set of training data is determined for the microservices within the network. At least a portion of data is excluded from the initial set of training data to generate a subset of training data. A QoS behaviour model is generated based on the subset of the training data.

According to certain embodiments, a network node for performance modeling of a plurality of microservices includes processing circuitry configured to deploy the plurality of microservices within a network. The plurality of microservices are communicatively coupled to generate at least one service chain for providing at least one service. Based on a resource allocation configuration, an initial set of training data is determined for the plurality of microservices within the network. At least a portion of data is excluded from the initial set of training data to generate a subset of training data. A QoS behaviour model is generated based on the subset of the training data.

According to certain embodiments, a computer program comprises instructions which when executed on a computer perform a method for performance modeling of microservices. The instructions may be executed to deploy the microservices within a network such that the microservices are communicatively coupled to generate at least one service chain for providing at least one service, determine an initial set of training data based on a resource allocation configuration, and exclude at least a portion of data from the initial set of training data to generate a subset of training data. A QoS behaviour model is generated based on the subset of the training data.

According to certain embodiments, a computer program product comprises a computer program comprising instructions which when executed on a computer perform a method for performance modeling of microservices. The instructions may be executed to deploy the microservices within a network such that the microservices are communicatively coupled to generate at least one service chain for providing at least one service, determine an initial set of training data based on a resource allocation configuration, and exclude at least a portion of data from the initial set of training data to generate a subset of training data. A QoS behaviour model is generated based on the subset of the training data.

According to certain embodiments, a non-transitory computer readable medium stores instructions which when executed by a computer performs a method for performance modeling of microservices. The instructions may be executed to deploy the microservices within a network such that the microservices are communicatively coupled to generate at least one service, determine an initial set of training data based on a resource allocation configuration, and exclude at least a portion of data from the initial set of training data to generate a subset of training data. A QoS behaviour model is generated based on the subset of the training data.

Certain embodiments of the present disclosure may provide one or more technical advantages. For example, certain embodiments may provide an automated and configurable approach for modeling any given cloud-native system's dynamics by modeling the correlation between any QoS metrics with each and all microservice's resource types configuration (CPU size, memory size, etc.) such that the extracted regression models can predict the system's behaviour in a scaled environment with given contention ratios (even environments that had not been tested beforehand, but with the same or very similar hardware/OS/network configuration). This may dramatically reduce both OPEX and CAPEX such as by reducing the cost of dimensioning procedure, reducing SLA violations, reducing energy consumption and infrastructure cost, and increasing customer satisfaction as this gives a better estimate on infrastructure cost during initial SLA negotiation.

Another advantage may be that certain embodiments extract a behavioural model for microservices with any kind of QoS/performance behaviour, either linearly or non-linearly, or any other kind of distribution. Moreover, certain embodiments may provide a parametrized solution, so that one can change, add, delete or adjust modeling parameters to get the best results if needed. Moreover, certain embodiments work with any type of resource types, QoS metrics and SLAs.

Still another advantage may be that certain embodiments reduce the SLA violations and increase the MTBF by providing an optimally overprovisioned initial resource footprint configuration and replication size for each microservice based on the extracted QoS behaviour models and with regards to the given user's SLA constraints.

Yet another advantage may be that certain embodiments may work on either a lab/test environment (and extrapolate the results to predict QoS in production environment/firm and recommend resource with high accuracy), or the production environment/firm).

Still another advantage may be that, even though the disclosed techniques and solutions were applied to cloud-native applications, one can apply the techniques and solutions to any kind of cloud applications.

Yet another advantage may be that certain embodiments effectively reduce the cost of dimensioning through reduced testing and more accurate predictions of initial resource footprint and replication size configuration. Typically, it is too expensive to measure all traffic profiles and dimensional parameters. Therefore, traditionally it's been calculated based on the input parameters from the customer on-demand. However, certain embodiments disclosed herein make it possible to accurately estimate the QoS metrics beforehand and with lower cost. This may be essential when running microservices as the they may have many more dimensional parameters.

Another technical advantage may be that certain embodiments reduce the energy consumption by assigning an efficient capacities and replication sizes to each microservice.

Still another technical advantage may be that certain embodiments are compatible with user's custom configurations (such as custom affinity/anti-affinity rules).

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Particular embodiments are described in FIGS. 1-15 of the drawings, like numerals being used for like and corresponding parts of the various drawings.

Certain embodiments of the present disclosure may provide solutions enabling model-based resource recommendation for cloud applications by the network node. Certain embodiments may include functionality providing a model based approach for extracting resource capacity and replication size versus application's QoS behaviours. In particular, certain embodiments may perform only a minimal set of benchmarks (instead of trying out all possible combinations) to recommend an efficient initial resource configuration for each microservice. According to certain embodiments, the recommended resource configuration may satisfy all the required QoS constraints agreed on a given user's SLA. In a particular embodiment, the techniques may be implemented on a cloud-native 5G HSS-frontend prototype together with an MME simulator, which both are deployed on top of Kubernetes. Such a system may reach 87% accuracy in the initial modeling phase.

Figure 1:
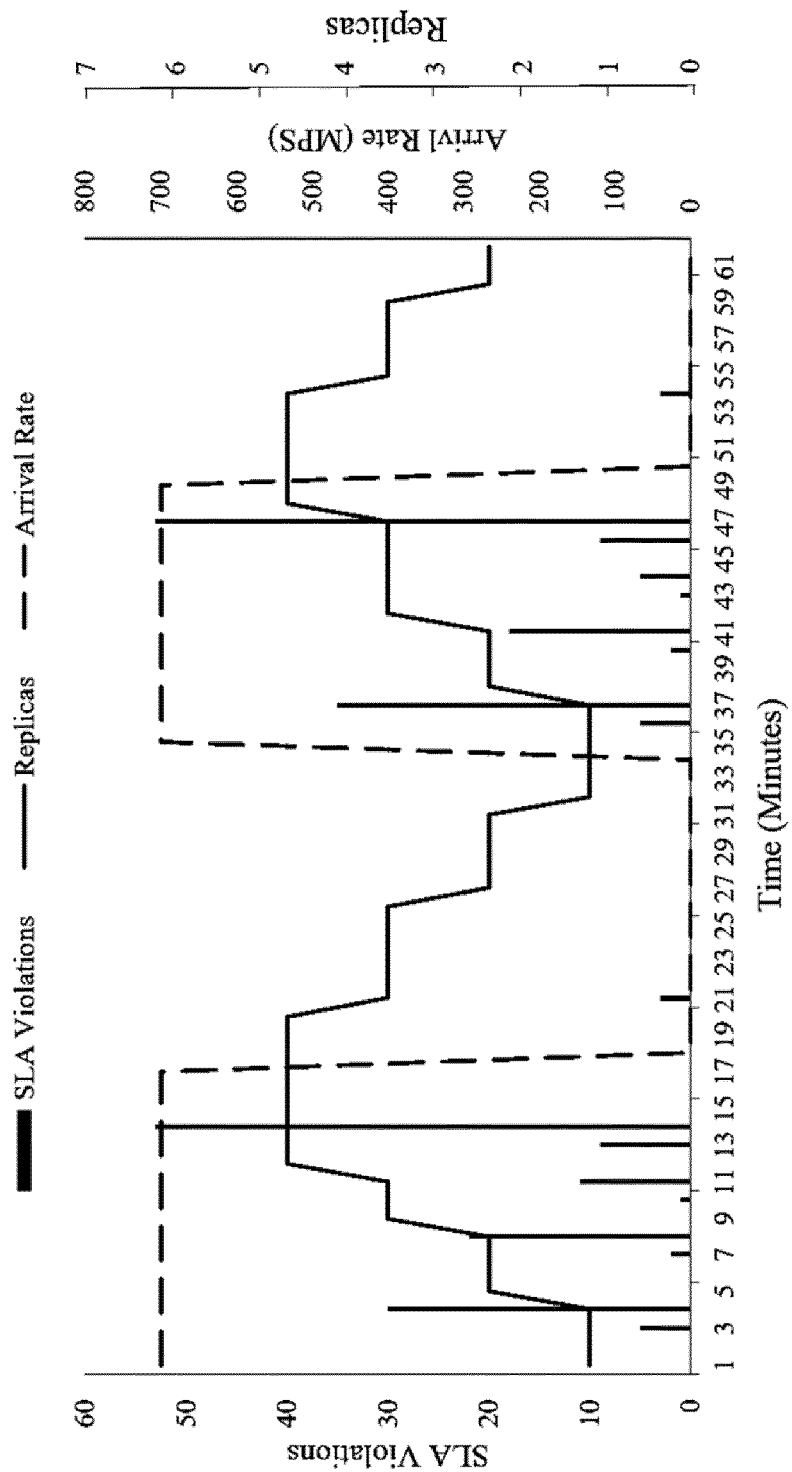
FIG. 1 illustrates example Service Level Agreement (SLA) violations and scaling operations when resource requirements are too small or too big.
Figure 2:
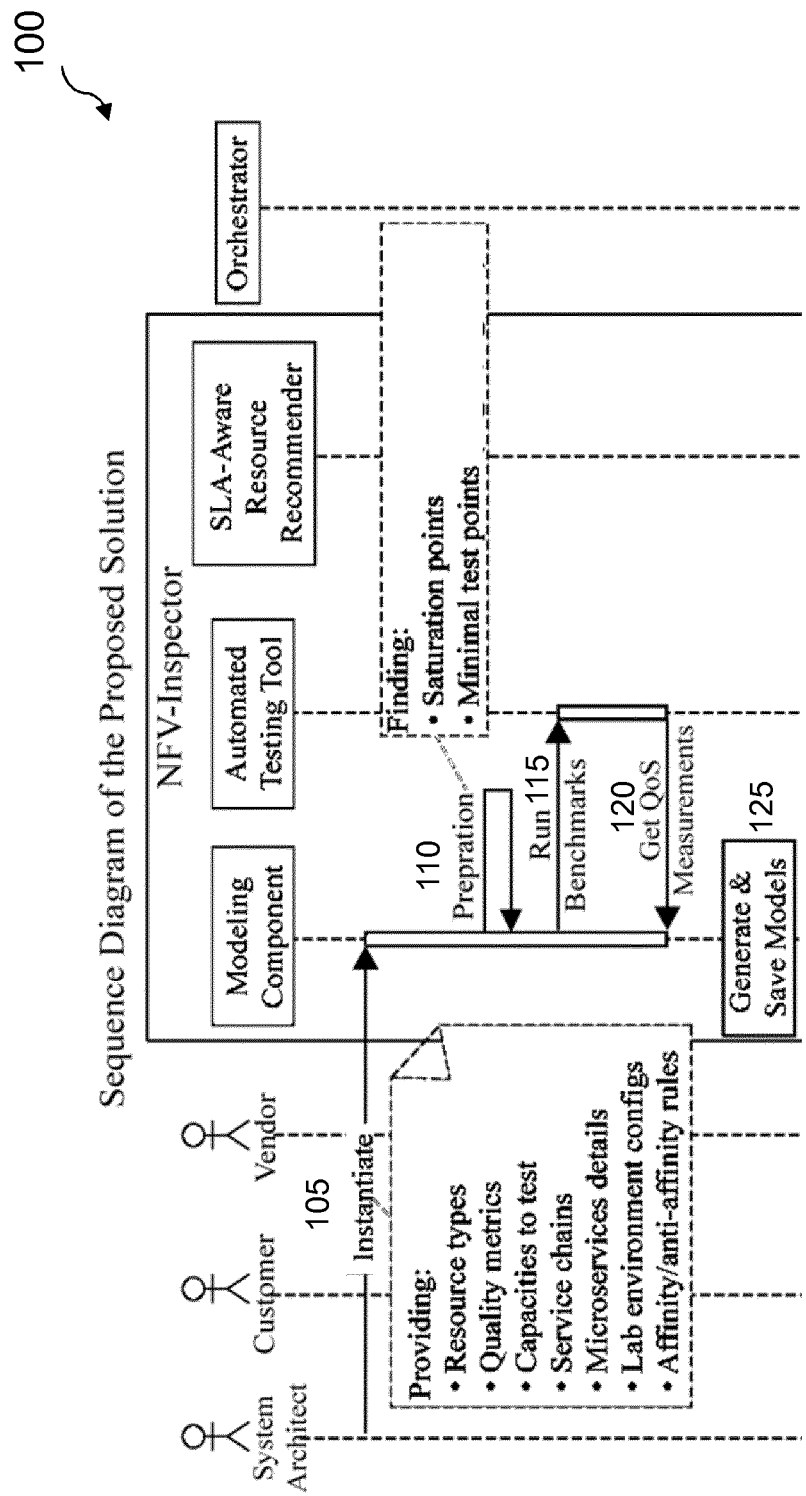
FIG. 2 illustrates a high-level sequence diagram of the proposed solution, according to certain embodiments.

FIG. 2 illustrates a high-level sequence diagram 100 of the proposed solution, according to certain embodiments. Note that actors, steps and actions in this and other illustrations may be different in various contexts.

At step 105, the sequence begins with the instantiation of the procedure by a system architect, a customer, a vendor, or another user of the system. As depicted, in particular embodiments, the user may instantiate the process by providing resource types, quality metrics, capacities to test, service chains, microservice(s) details, lab environment configurations, affinity/anti-affinity rules, and other parameters.

At step 110, the modeling component of the NFV-Inspector prepares the lab environment and deploys the microservices in the lab environment. As part of the preparation process, the saturation points and minimal test points may be discovered.

At step 115, the benchmarking procedures are performed. As described in more detail below, the objective is to select and benchmark only a small subset of configurations and predict the value of the rest using ML models.

At step 120, the automated testing tool provides QoS measurements. The QoS measurements are used to generate a QoS behaviour model at step 125. In a particular embodiment the QoS behaviour model includes a ML QoS behaviour model.

Figure 3:
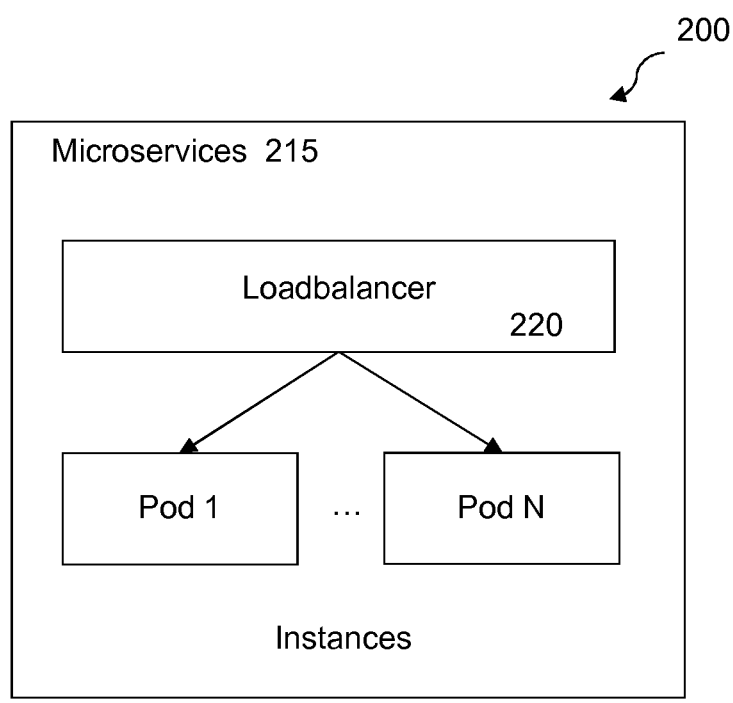
FIG. 3 illustrates an example organization of an NFC system, according to certain embodiments.

FIG. 3 illustrates an example organization of an NFC system 200, according to certain embodiments. As shown in FIG. 3, the NFC system is composed of a set of CNFs $\{CNF_i\}_{i=i}^{|CNF|}$ 210 in which consists of a number of microservices $$\{MS_{i,j}\}_{j=1}^{|MS_i|}$$

215. According to certain embodiments, each microservice $MS_{i,j}$ 215 may be load-balanced among a set of replication instances $\{ms_{i,j}^l\}_{l=1}^{|ms_{i,j}|}$ and placed on a substrate network, which is the underlying physical network. Worker nodes 220 that compose network denotes as $M=\{m_o\}_{o=1}^{|M|}$. Each worker node 220 can host one or several microservice 215 instances. Each $m_o \in M$ may be specified with its resource types capacities $C^{r_d}(m_o)$, where $r_d \in R$ is a resource types (CPU, memory, huge-page table, etc.). In the same way, each microservice instance $ms_{i,j}^l$ 215 capacity is denoted as $C^{r_d}(ms_{i,j}^l)$ with respect to the minimum and maximum allocatable capacity to each resource type denoted as $C_{min}^{r_d}(MS_{i,j})$ and $C_{max}^{r_d}(MS_{i,j})$ respectively. The total amount of assigned resource capacities of a microservice $MS_{i,j}$ 215 is denoted on each resource type $r_d$ as follows:

$$C_{total}^{r_d}(MS_{i,j}) = \sum_{l=1}^{|ms_{i,j}|} C^{r_d}(ms_{i,j}^l)$$

Figure 4:
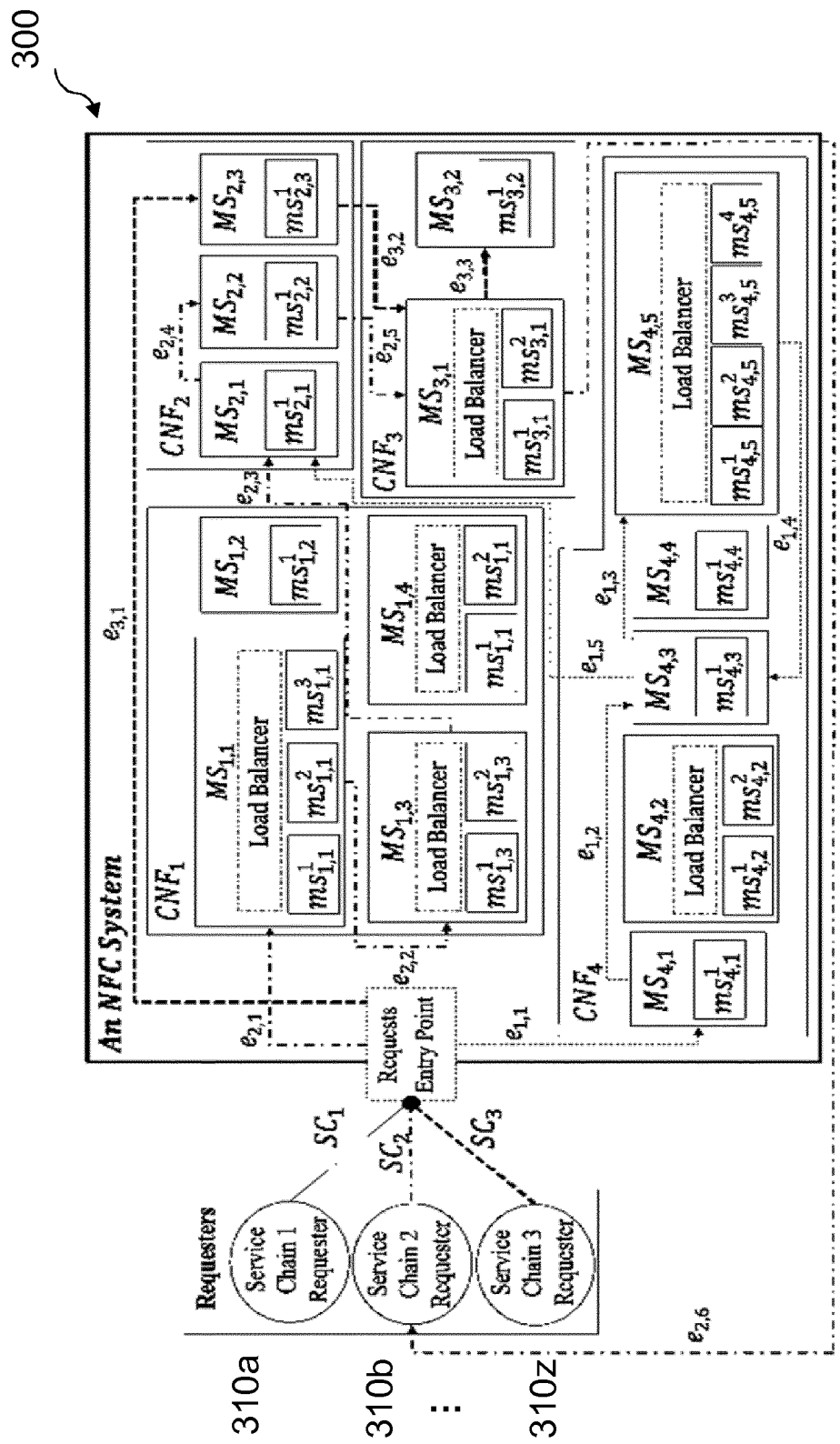
FIG. 4 illustrates a service chain flow in an NFC system, according to certain embodiments.

FIG. 4 illustrates a service chain flow 300 in an NFC system. The goal of these microservices 215 is to serve a series of service chains $\{SC_k\}_{k=1}^{|SC|}$ 310a-z, as depicted in FIG. 4. These service chains 310a-z represent the connection and traffic flow between microservices 215, which may be specified as a directed graph $G(SC_k)=(MS^k, E^k)$, where $MS^k$ is a subset of all microservices 215 that have a role in providing service $SC_k$ and $E^k$ is the subset of all edges belongs to the service chain $SC_k$ 310a-z. Each service chain $SC_k$ 310a-z has a request entry point that receives requests from potential requesters via the Network Function Virtualization Infrastructure (NFVI). To provide a service $S_k$, each $SC_k$ 310a-z traverses an ordered set of microservices $(MS_{i,j}, \ldots, MS_{i',j'})$ 215 belonging to $(CNF_i, \ldots, CNF_{i'})$. These microservices 215 are connected through one or more directed virtual links $\{e_{k,1}(MS_{a,b}, MS_{a',b'}), \ldots, e_{k,n}(MS_{c,d}, MS_{c',d'})\}$. Moreover, according to certain embodiments, the NFC system comes with a set of affinity/anti-affinity rules for the placement of the microservices 215 in an environment. For example, a pair of microservices 215 may need to be placed on the same worker node 220 if they have a high affinity relation. A pair of microservices 215 would have a high affinity, for example, if the pair communicate frequently with each other and exchange a large amount of data. On the other hand, some microservices 215 may need to be placed on separate worker nodes 220 if they have a high anti-affinity relation. This can happen, for example, when there exist two critical microservices 215 and there is a need to ensure the service availability in the case of failure of a physical node. These criteria are assumed and will be provided by the system admin.

Matrix U and U' are created to hold all the affinity and anti-affinity rules respectively. Each matrix has dimension $|MS| \times |MS|$ where each row and column represents one of the microservices. An entry $U_{ab}$ takes on a value of 1 if microservices a and b have a high affinity and must be placed at the same worker node. Additionally, an entry $U_{ab}'$ takes on a value of 1 if microservice a and b have a high anti-affinity and must not be placed at the same worker node 220.

$$U_{ab} = \begin{cases} 1, & \text{Affinity}_{ab} = \text{True} \\ 0, & \text{Affinity}_{ab} = \text{False} \end{cases}$$

$$U_{ab}' = \begin{cases} 1, & \text{AntiAffinity}_{ab} = \text{True} \\ 0, & \text{AntiAffinity}_{ab} = \text{False} \end{cases}$$

To evaluate the performance of an NFC system, one should measure the key QoS metrics (serving throughput, latency, etc.). This set of QoS metrics may be defined as $Q = \{q_c\}_{c=1}^{|Q|}$. Assuming that an SLA agreement for a customer a on service chain $SC_k$ 310a-z and QoS metric $q_c \in Q$ is in place, $SLA_\alpha^k(q_c)$ may be defined such that it denotes the guaranteed value of QoS metric $q_c$ in user $\alpha$SLA agreement on service chain $SC_k$ 310a-z.

According to certain embodiments, CNFs QoS metrics behaviour modeling may be based on an algorithm that performs a minimal set of benchmarks and recommends a resource allocation and replica size configuration for each microservice 215 in a service chain 315. In other words, for each $SC_k$, 215 given a set of SLA requirements $\{SLA_\alpha^k(q_c)\}_{q_c \in Q}$, the final goal is to recommend an optimal amount of resource capacities for each microservice $MS_{i,j}$ 215 in a production environment based on a minimum number of experiments in a smaller-scale deployment and guaranty the agreed QoS constraints on all QoS metrics $q_c \in Q$ for a user $\alpha$. It is assumed that the NFC system comes with a sophisticated benchmark tool that allows to define a test scenario based on a given service chain(s), arrival rate(s), duration(s) and burst setting(s).

Figure 5:
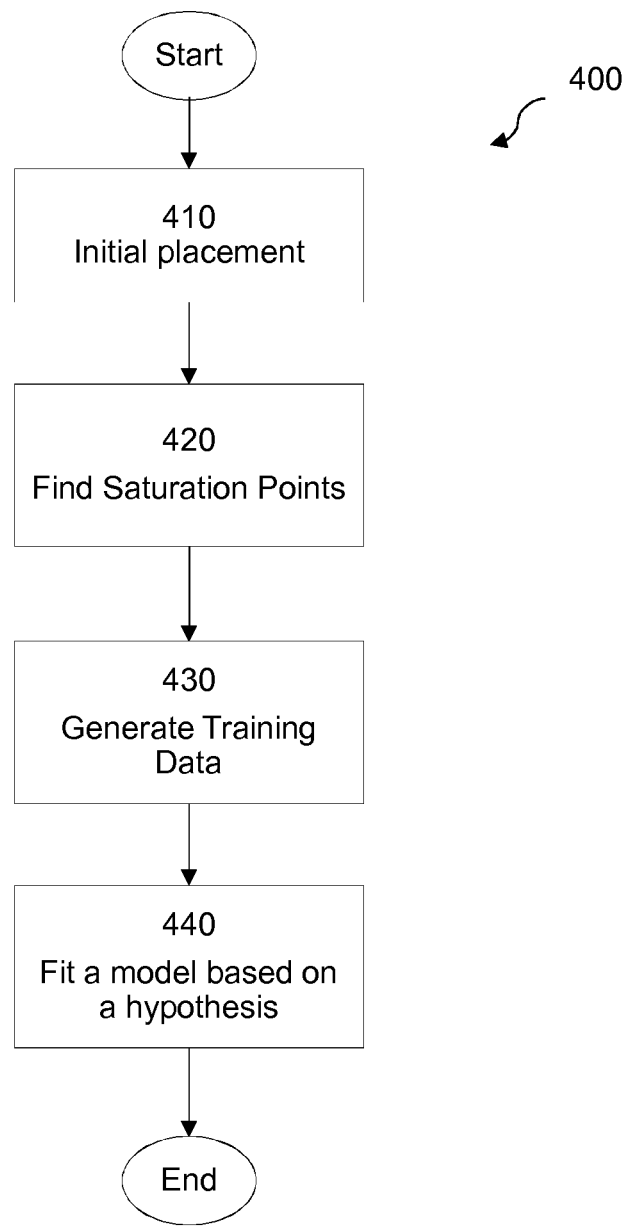
FIG. 5 illustrates an example modeling process, according to certain embodiments

FIG. 5 illustrates an example modeling process 400, according to certain embodiments. Specifically, at a step 410, an initial placement of microservices 215 is determined. At step 420, the saturation points for a set of data are found. At step 430, training data is generated. At step 440, a model is fit based on a hypothesis. Each of these steps are described in more detail below.

For example, with regard to the initial placement of the microservices 215 at step 410, it is recognized that before starting to perform benchmarks, the CNF's microservices are deployed on a lab environment. According to certain embodiments, in order to get accurate results, this deployment may follow one or more of the following criteria:

Each microservice 215 may be placed on a completely isolated worker node 220, such that other microservices 215 may not have negative performance effect over a microservice 215 (no noisy neighbour). If worker nodes 220 are VMs, they need to be explicitly pinned to CPU cores (using NUMA filters in case of OpenStack).

The placement of microservices 215 may need to hold all affinity rules, according to certain embodiments.

There should be minimum systemic performance bottlenecks in the deployment (no misconfigurations, scalability issues, etc.) such that the resource allocation configuration of microservices would be the only bottleneck for getting higher QoS.

Except for resource capacities and scale, the lab environment infrastructure (equipment/hardware, operating system, bandwidth, etc.) must be as similar as possible to the production environment, to minimize prediction errors.

Figure 6:
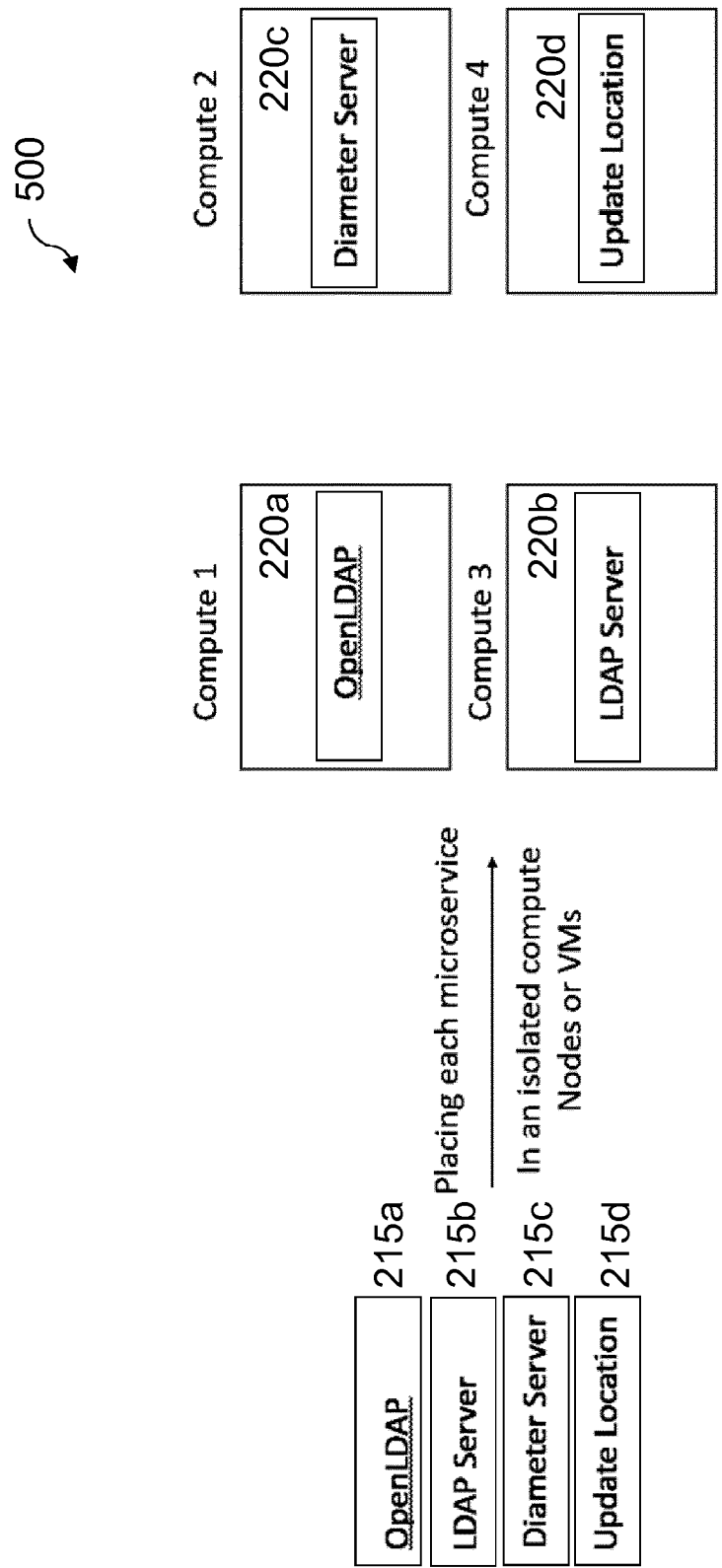
FIG. 6 illustrates an example initial placement of a number of microservices on worker nodes, respectively, according to certain embodiments.

FIG. 6 illustrates an example initial placement of a number of microservices 215a-d on worker nodes 220a-d, respectively, according to certain embodiments. Specifically, as depicted each of microservices 215a-d are placed on a respective one of worker nodes 220a-d. It is recognized, however, that FIG. 6 is merely an example of an initial placement. Multiple microservices 215 may be placed on a single worker node 220, in other embodiments.

As mentioned in previous sections, one of the main challenges with CNFs is the huge number of separately configurable microservices 215 as well as sheer number of combinations of configuration parameters which makes it very time consuming to benchmark all possible setting. If there is no systemic bottleneck in a deployment (based on the criteria discussed above) and QoS measures in a service chain 315 behave harmonically (as is typical) with the amount of resource capacities assigned to its microservices 215, an algorithm is proposed to effectively select and benchmark only a small subset of configurations and predict the value of the rest using machine learning models. Because it is not necessary to try out all possible resource configurations with this methodology, both the dimensioning time as well as the number of benchmarks required is dramatically reduced for modeling the effect of resource configuration of microservices 215 on a service chain's QoS measurements.

The goal of certain embodiments is to model the effect of resource allocation configuration (e.g. CPU and memory capacities) of each microservice 215 in a service chain 315 on overall QoS metric values (e.g. throughput). But, before starting the modeling procedure, a set of data points is required to train the machine learning models, as discussed above with regard to step 430 of FIG. 5.

According to certain embodiments, such training data is gathered by selecting a single microservice 215 at a time and assigning a resource allocation configuration $T_p = (t_p(r_{d_1}), \ldots, t_p(r_{d|R|}))$ (e.g. a $t_p(cpu)$ can be measured as the milicpu, or for memory can be measured as bytes) to each of its resource types $r_d \in R$ (e.g., CPU, memory, etc.), while assigning maximum possible resources to other microservices in the service chain 315. In this way and considering the placement of all microservices 215 are following all the criteria discussed above, it can be safely assumed that the only microservice 215 that can possibly become a bottleneck (before the QoS metrics start saturating) is the one under the test. With this method, QoS metric $q_c \in Q$ (e.g. serving throughput, latency, CPU utilizations, etc.) values $V^k(q_c)$ (e.g., throughput or latency) start saturating after a specific CPU and memory capacity threshold. Even in some cases, assigning more resources (e.g., CPU cores) may cause lower QoS (e.g., less serving throughput) due to possible contentions. If a microservice CPU or memory capacity has a small contribution on the service chain's final QoS, utilizing such benchmarking procedure may result in quick saturation of the QoS metric values. In contrast, if the microservice 215 plays a key role in providing the intended service, system's QoS metric values may start saturating on the edge of worker node's CPU capacity limits (or even never saturate). This means that if bigger worker nodes are used and more CPU or memory capacities are assigned to these key microservices 215 in the service chain 315 or if more replicas/instances of the microservice 215 are created, then other less-contributing microservices 215 may start saturating slower. Therefore, to form an accurate prediction model, all saturation points may be excluded from the test data. For the rest of the test space, only a random number of points are kept so as to both reduce the number of experiments (and as a result reduce the dimensioning time) as well as to avoid over-fitting of the models.

Figure 7:
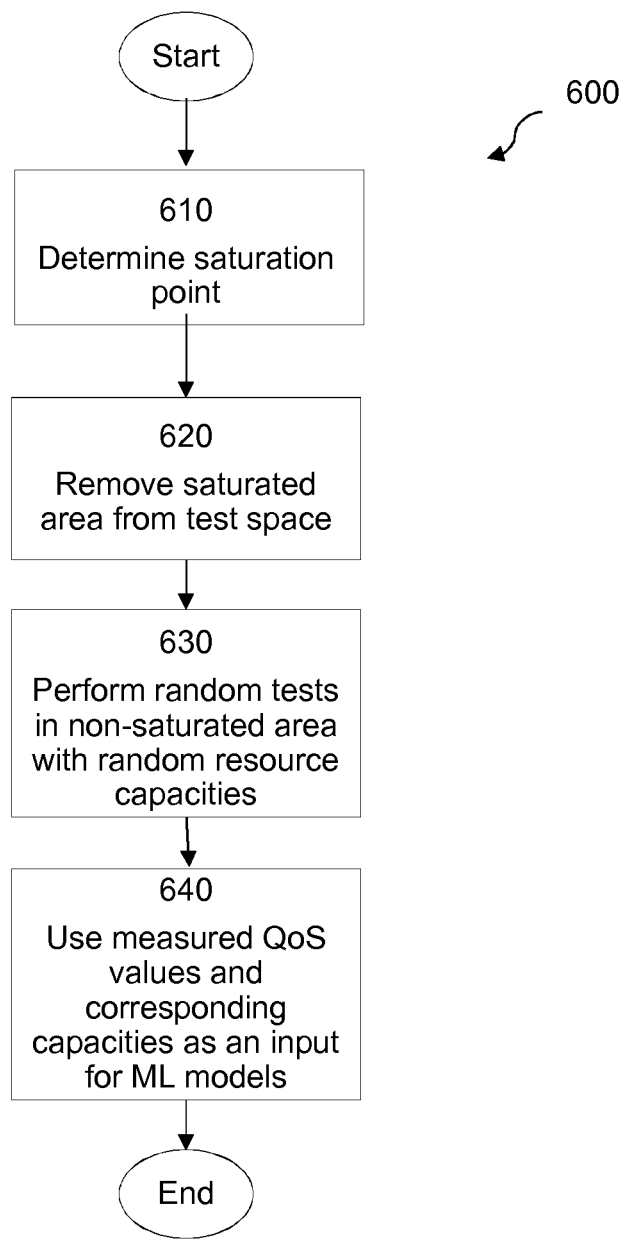
FIG. 7 illustrates a minimal benchmarking procedure, according to certain embodiments.

FIG. 7 illustrates a minimal benchmarking procedure, according to certain embodiments. At step 610, the saturation point is determined. For example, a binary search may be performed to find the saturation point on one resource type (e.g., memory capacity). The same search may then be repeated for other resource types (e.g., CPU capacity). The process will result in finding the key saturation point. The saturation point corresponds to the point at which increasing resource capacities after that point will not have dramatic effect on the system's performance. As a result, QoS metrics starts saturating after that point.

Figure 8:
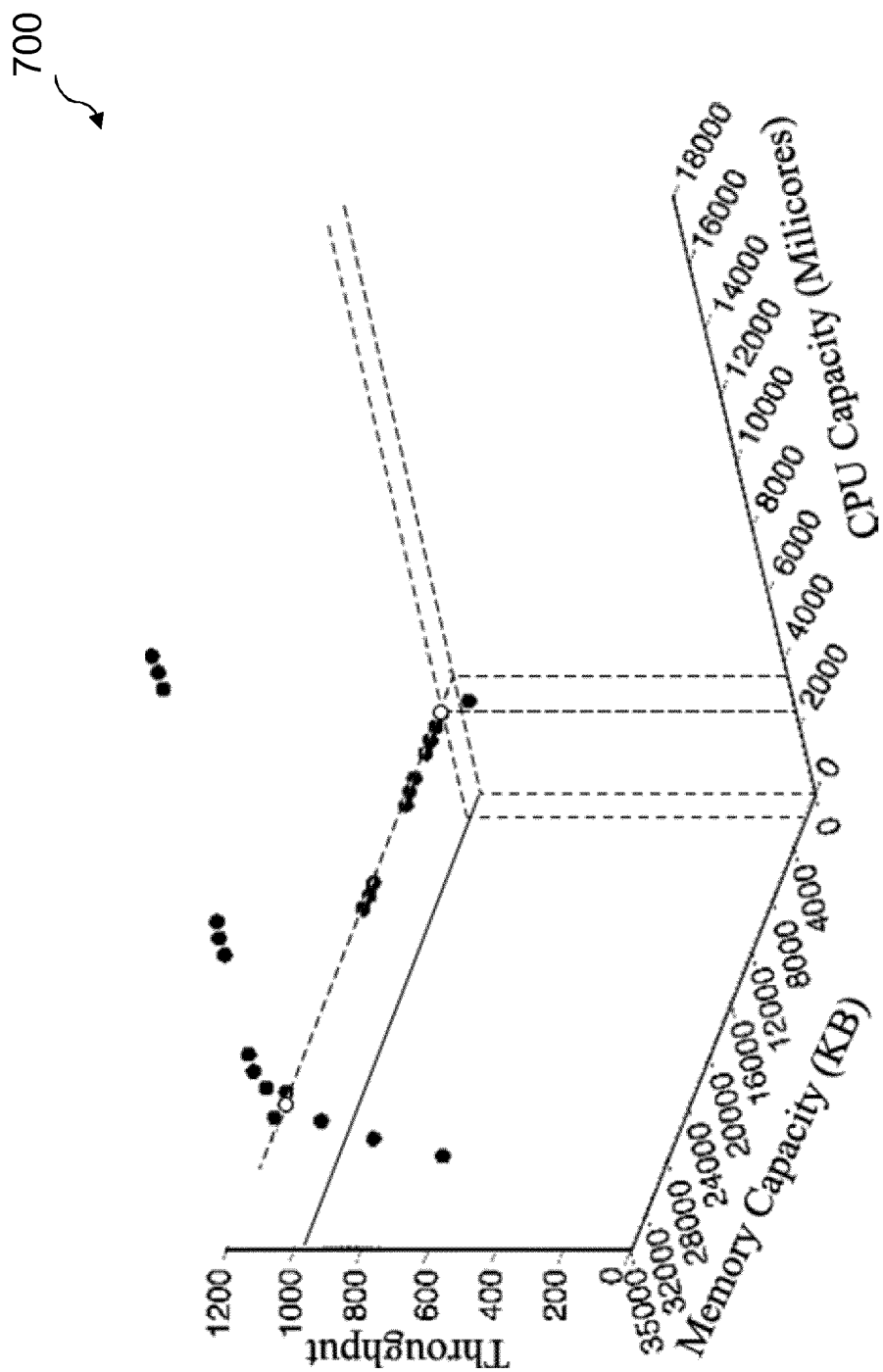
FIG. 8 illustrates an example plot for determining saturation points, according to certain embodiments.

FIG. 8 illustrates an example plot 700 for determining saturation points, according to certain embodiments. Specifically, FIG. 8 represents all the attempts to find the saturation point in a Lightweight Directory Access Protocol (LDAP) Server prototype, according to one particular example embodiment.

Returning to FIG. 7, after finding this key saturation point, the saturated area associated with a saturation point is removed from the test space, at step 620. For example, the test space may be divided into divisions and all the points in the saturated area may be excluded.

Figure 9:
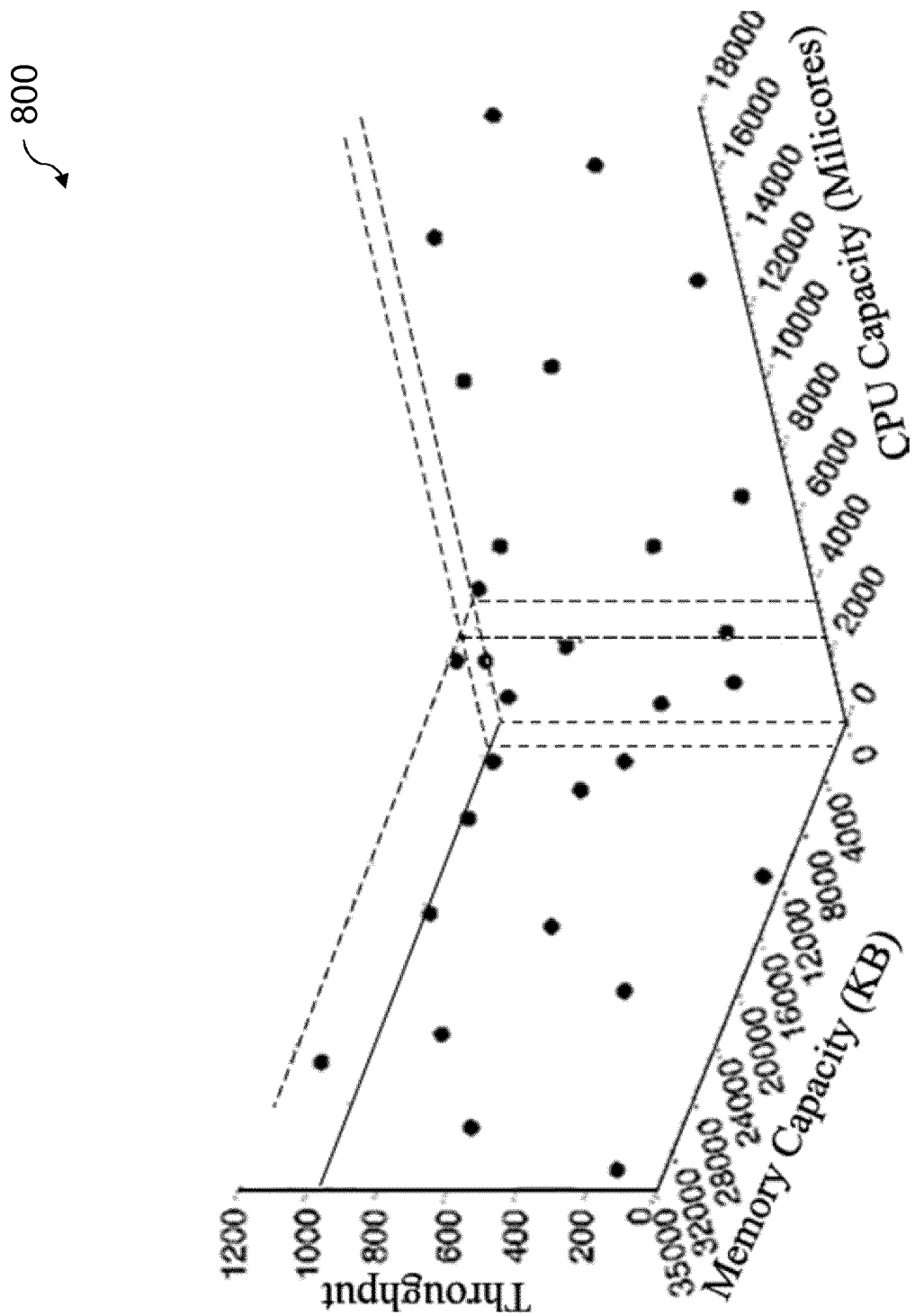
FIG. 9 illustrates an example plot depicting the performance of random benchmarks in a non-saturated area, according to certain embodiments.

At step 630, random tests are then performed on the non-saturated area. The random tests are performed with random resource capacities. For the rest of the points, a random set of points is selected in the test space and the number of test points is kept proportional to the size of each division to avoid over-fitting of the machine learning models in the next step. FIG. 9 illustrates an example plot 800 depicting the performance of random benchmarks in a non-saturated area, according to certain embodiments.

At step 640, measured QoS values and corresponding capacities are used as input for ML models. More specifically, according to certain embodiments, regression models are used to form QoS behaviour models of an NFV system based on the training data gathered in step 630, so that for a given a resource allocation configuration, the value of a given QoS metric may be predicted when a particular service chain is running. Once this data is collected, for a given microservice $MS_{i,j}$, QoS metric $q_c$ and a service chain $SC_k$ a separate regression model $\widehat{V^k_{i,j}}(q_c)$ is trained to predict the value of $q_c$, when resource allocation size of $MS_{i,j}$ is $T_p$.

Figure 10:
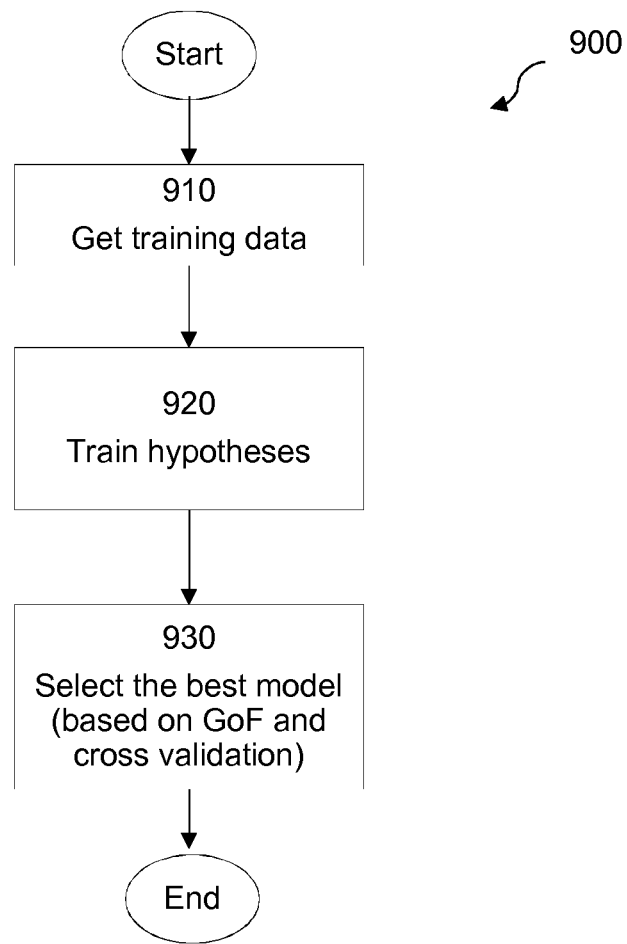
FIG. 10 illustrates the entire data collection and modeling workflow, including hypotheses selection and training procedure, according to certain embodiments.

FIG. 10 represents the entire data collection and modeling workflow, including hypotheses selection and training procedure. Specifically, at step 910, the training data is obtained. According to a particular embodiment, to train each regression model $\widehat{V^k_{i,j}}(q_c)$ we use the training input set $$\{T_p\}_{\in \widetilde{T^k_{i,j}}(q_c)}$$

that was constructed using the process described above with regard to FIG. 7 along with corresponding targets $$\{V^k_{i,j}(q_c, T_p)\}_{T_p \in \widetilde{T^k_{i,j}}(q_c)}$$

the former of which represents a multi-dimensional matrix as each $T_p$ itself is a set of resource allocation sizes for all resource types.

At step 920, the hypotheses are trained. For example, to learn an approximation regression model with the objective of making accurate prediction of QoS metric value $V^k(q_c)$ for previously unseen template $T_p$, the disclosed method tries out different hypothesis functions $h_i(.)$ and, at step 930, chooses the one that fits best with the training data such that the selected hypothesis function has the highest Goodness of Fit (GoF) as well as better cross-validation results. Naturally, each microservice 215 may behave differently, and therefore different hypotheses may need to be tested. Studies have shown that the throughput of around 85% of all type of applications can be modeled using a polynomial hypotheses. For instance, assuming there are two resource types $r_1$ and $r_2$ (e.g., CPU, memory, etc.) and a quality metric $q_c$ (e.g., serving throughput), and assuming all microservices follows a monotonically increasing performance model, such that by increasing the capacity of each resource type (up to a limit) QoS measurements will either increase or remain the same, the hypotheses $\{h_i(C_{total}{}^{r_1}, C_{total}{}^{r_2})\}_{i+1}^{|h|}$ may be defined as (but are not limited to) as follows:

$$h_1 = \lambda_1 C_{total}{}^{r_1} + \lambda_2 C_{total}{}^{r_2} + \lambda_3$$

$$h_2 = \lambda_1 C_{total}{}^{r_1} + \lambda_2 C_{total}{}^{r_2} + \lambda_3 C_{total}{}^{r_1} C_{total}{}^{r_2} + \lambda_4$$

$$h_3 = \lambda_1 C_{total}{}^{r_1} + \lambda_2 C_{total}{}^{r_2} + \lambda_3 C_{total}{}^{r_1} C_{total}{}^{r_2} + \lambda_4 (C_{total}{}^{r_1})^2 + \lambda_5$$

$$h_4 = \lambda_1 C_{total}{}^{r_1} + \lambda_2 C_{total}{}^{r_2} + \lambda_3 C_{total}{}^{r_1} C_{total}{}^{r_2} + \lambda_4 (C_{total}{}^{r_2})^2 + \lambda_5$$

$$h_5 = \lambda_1 C_{total}{}^{r_1} + \lambda_2 C_{total}{}^{r_2} + \lambda_3 C_{total}{}^{r_1} C_{total}{}^{r_2} + \lambda_4 (C_{total}{}^{r_1})^2 + \lambda_5 (C_{total}{}^{r_2})^2 + \lambda_6$$

After training all hypotheses $\{h_i(C_{total}{}^{r_1}, C_{total}{}^{r_2})\}_{i=1}^{|h|}$ and based on their GoF values and cross validation results, a final hypothesis $\widehat{h_\alpha}$ will be selected at step 930 and a regression model $\widehat{V^k_{i,j}}(q_c)$ is trained to estimate the value of $V^k(q_c)$ when the resource allocation configuration of $MS_{i,j}$ is equal to $T_p$.

Figure 11:
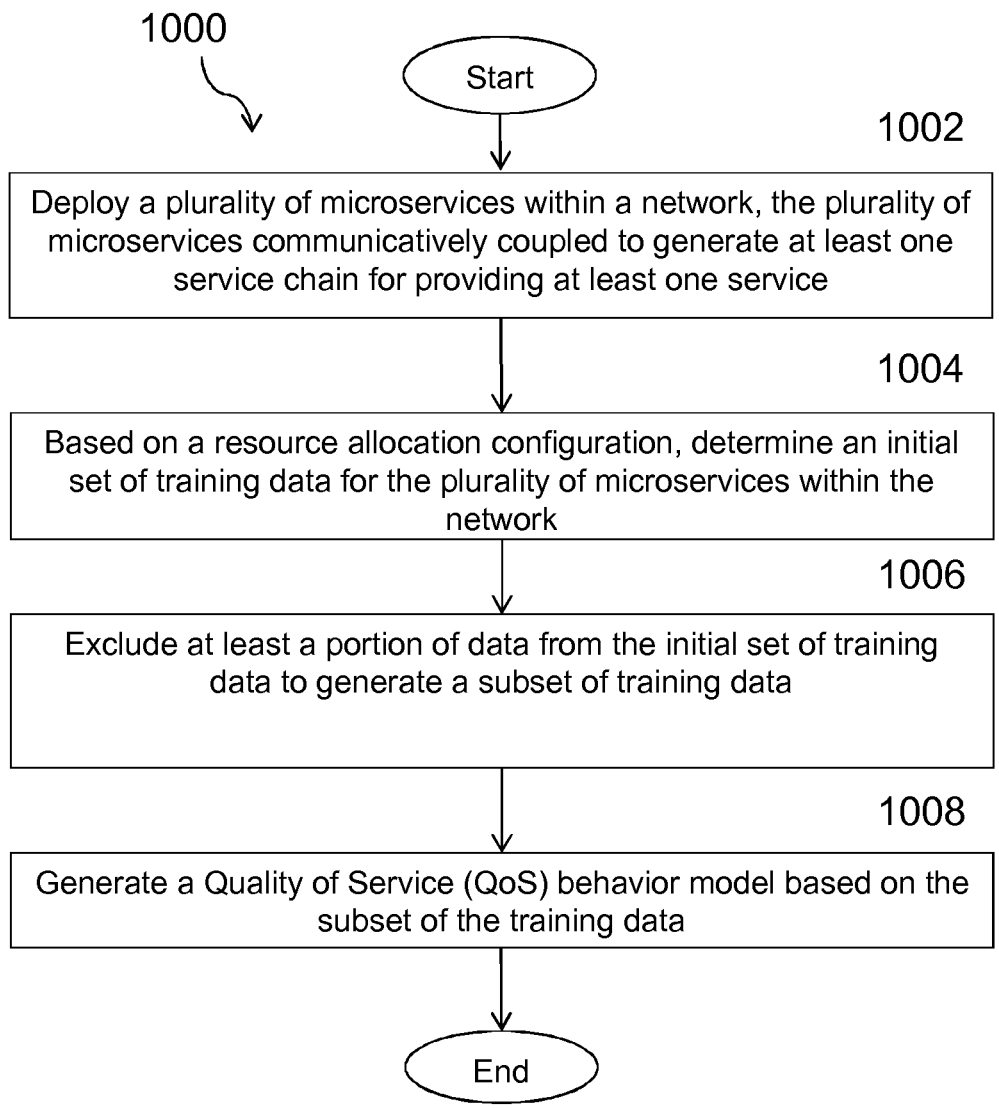
FIG. 11 illustrates another example method for performance modeling of a plurality of microservices, according to certain embodiments.

FIG. 11 depicts another example method for performance modeling of a plurality of microservices. At step 1002, the method begins when the plurality of microservices are deployed within a network. The plurality of microservices are communicatively coupled to generate at least one service chain for providing at least one service. At step 1004, an initial set of training data is determined for the plurality of microservice based on a resource allocation configuration. At step 1006, at least a portion of data is excluded from the initial set of training data to generate a subset of training data. At step 1008, a QoS behaviour model is generated based on the subset of the training data.

In a particular embodiment, excluding the portion of data from the initial set of training data to generate the subset of training data includes: isolating resource allocation to each of the plurality of microservices; selecting one of the plurality of microservices; assigning a maximum respective resource allocation configuration to each of a plurality of resources associated with the microservices; determining a saturation point for the one of the plurality of microservices; and excluding a saturation area associated with the saturation point from the initial set of training data when generating the subset of training data.

In a particular embodiment, the saturation point includes a point when a quality of service associated with the one of the plurality of microservices starts saturating while increasing resources.

In a particular embodiment, the method further includes repeating the steps of isolating, selecting, assigning, determining, and excluding for a randomly selected subset of the plurality of microservices.

In a particular embodiment, the environment comprises a lab environment, which may include, as one example, a performance testing environment. The lab environment includes at least one infrastructure element. The at least one infrastructure element of the lab environment is selected to emulate a production environment to minimize prediction errors.

In a particular embodiment, the microservices may be isolated during placement, at a host level. If that is not possible, the microservices may be pinned to a CPU. For example, Kubernetes allows a docker process to be pinned to a particular set of cores. This may be done to avoid the nosy neighbor problem.

In a particular embodiment, a network topology of the lab environment emulates a network topology of the production environment.

In a particular embodiment, the at least one infrastructure element includes at least one of equipment, hardware, operating system, and bandwidth selected to emulate the production environment.

In a particular embodiment, deploying the plurality of microservices within the network includes using a network emulator.

In a particular embodiment, deploying the plurality of microservices within the network comprises determining at least one network node to host each of the plurality of microservices.

In a particular embodiment, a communication capacity of each of the plurality of microservices is considered when determining the at least one network node to host each of the plurality of microservices. In particular embodiments, the communication capacity may be the network bandwidth.

In a particular embodiment, the plurality of microservices are hosted on a plurality of network nodes. Each of the plurality of network nodes is elected to host at least one of the plurality of microservices based on at least one affinity rule or randomly.

In a particular embodiment, deploying the plurality of microservices within the network includes minimizing factors affecting QoS such that the resource allocation configuration is the only deterrent to getting a higher QoS value.

In a particular embodiment, selecting the QoS behaviour model based on the set of training data includes: testing a plurality of hypothesis functions for the plurality of microservices in the service chain; selecting one of a plurality of hypothesis functions that has a highest goodness of fit and cross-validation results to the set of training data; and training the QoS behaviour model to estimate at least one QoS metric. Though the steps described herein include training the QoS behaviour model to estimate at least one QoS metric, it is recognized that the techniques may be used to estimate any other kind of QoS metric, resource type, and/or hypothesis function.

In a particular embodiment, the method further includes using the QoS behaviour models to determine a value of the at least one QoS metric for the plurality of microservices in each service chain.

In a particular embodiment, the method further includes using the QoS behaviour models to determine an optimal amount of resource capacities of each of the plurality of microservices belonging to the service chain.

In a particular embodiment, the QoS behaviour model is a ML model.

Figure 12:
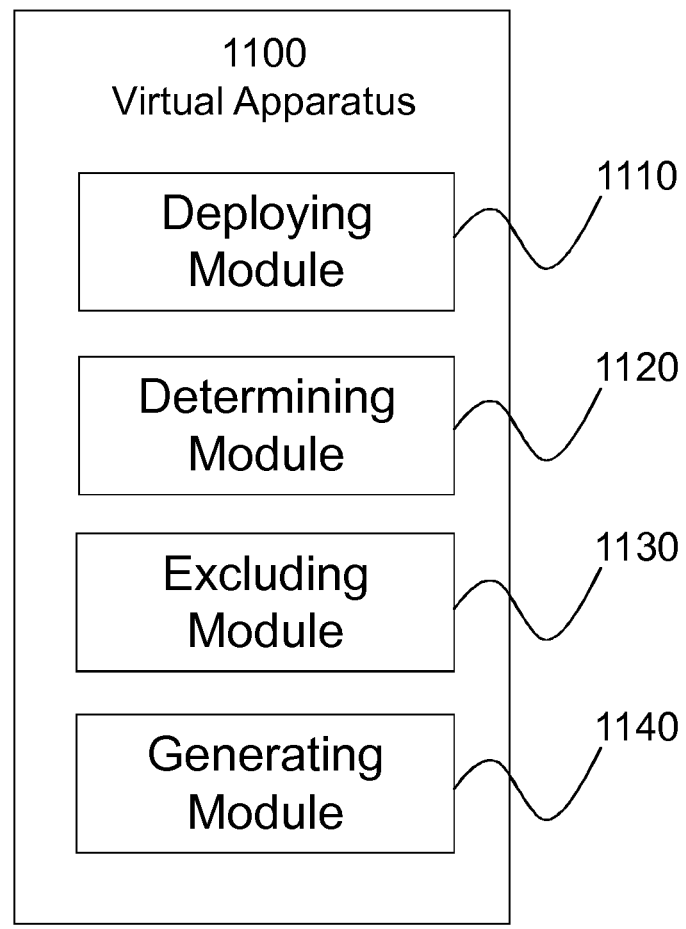
FIG. 12 illustrates a schematic block diagram of a virtual apparatus in a network, according to certain embodiments.

FIG. 12 illustrates a schematic block diagram of a virtual apparatus 1100 in a network. The apparatus may be implemented in a wireless device or network node. Apparatus 1100 is operable to carry out the example method described with reference to FIG. 11 and possibly any other processes or methods disclosed herein. It is also to be understood that the method of FIG. 11 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause deploying module 1110, determining module 1120, excluding module 1130, selecting module 1140, and any other suitable units of apparatus 1100 to perform corresponding functions according one or more embodiments of the present disclosure.

According to certain embodiments, deploying module 1110 may perform certain of the deploying functions of the apparatus 1100. For example, deploying module 1110 may deploy a plurality of microservices within a network. The plurality of microservices are communicatively coupled to generate at least one service chain for providing at least one service.

According to certain embodiments, determining module 1120 may perform certain of the determining functions of the apparatus 1100. For example, determining module 1120 may determine an initial set of training data for the plurality of microservice based on a resource allocation configuration.

According to certain embodiments, excluding module 1130 may perform certain of the excluding functions of the apparatus 1100. For example, excluding module 1130 may exclude at least a portion of data from the initial set of training data to generate a subset of training data.

According to certain embodiments, generating module 1140 may perform certain of the generating functions of the apparatus 1100. For example, generating module 1140 may generate a QoS behaviour model based on the subset of the training data.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 13:
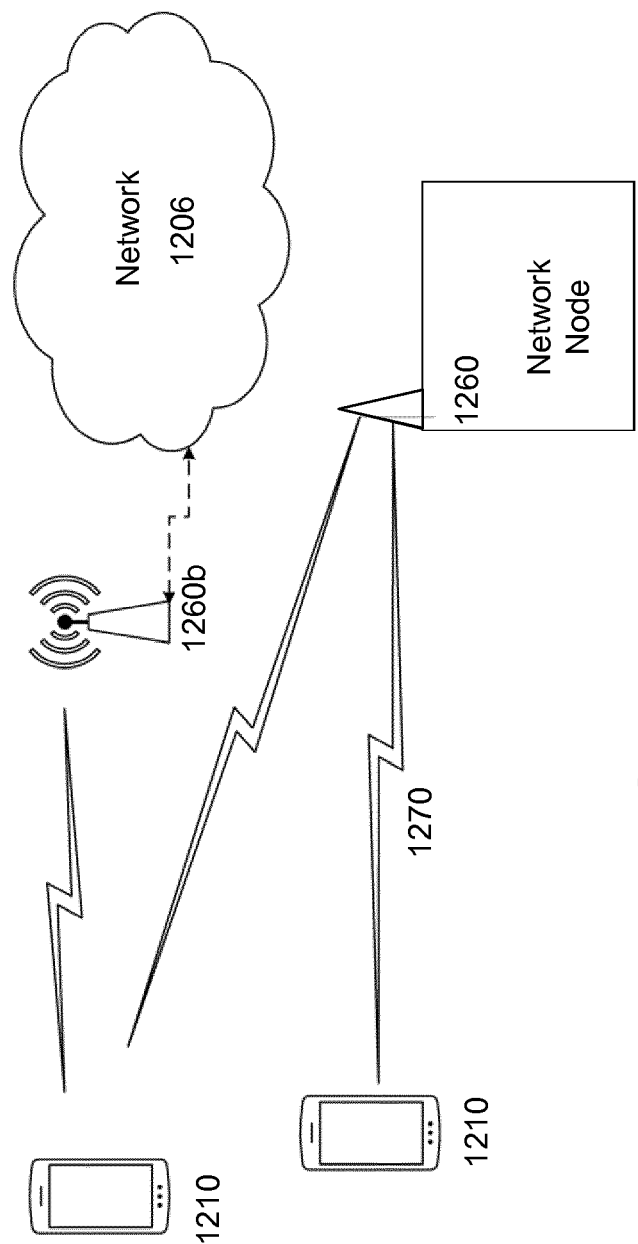
FIG. 13 illustrates an example wireless network, according to certain embodiments.

FIG. 13 illustrates a wireless network in which the above described methods for performance modeling of a plurality of microservices may be implemented, in accordance with some embodiments. Although the subject matter described herein may be implemented in any appropriate type of system using any suitable components, the embodiments disclosed herein are described in relation to a wireless network, such as the example wireless network illustrated in FIG. 13. For simplicity, the wireless network of FIG. 13 only depicts network 1206, network nodes 1260 and 1260*b*, and wireless devices 1210, 1210*b*, and 1210*c*. In practice, a wireless network may further include any additional elements suitable to support communication between wireless devices or between a wireless device and another communication device, such as a landline telephone, a service provider, or any other network node or end device. Of the illustrated components, network node 1260 and wireless device 1210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1260 and wireless device 1210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 14:
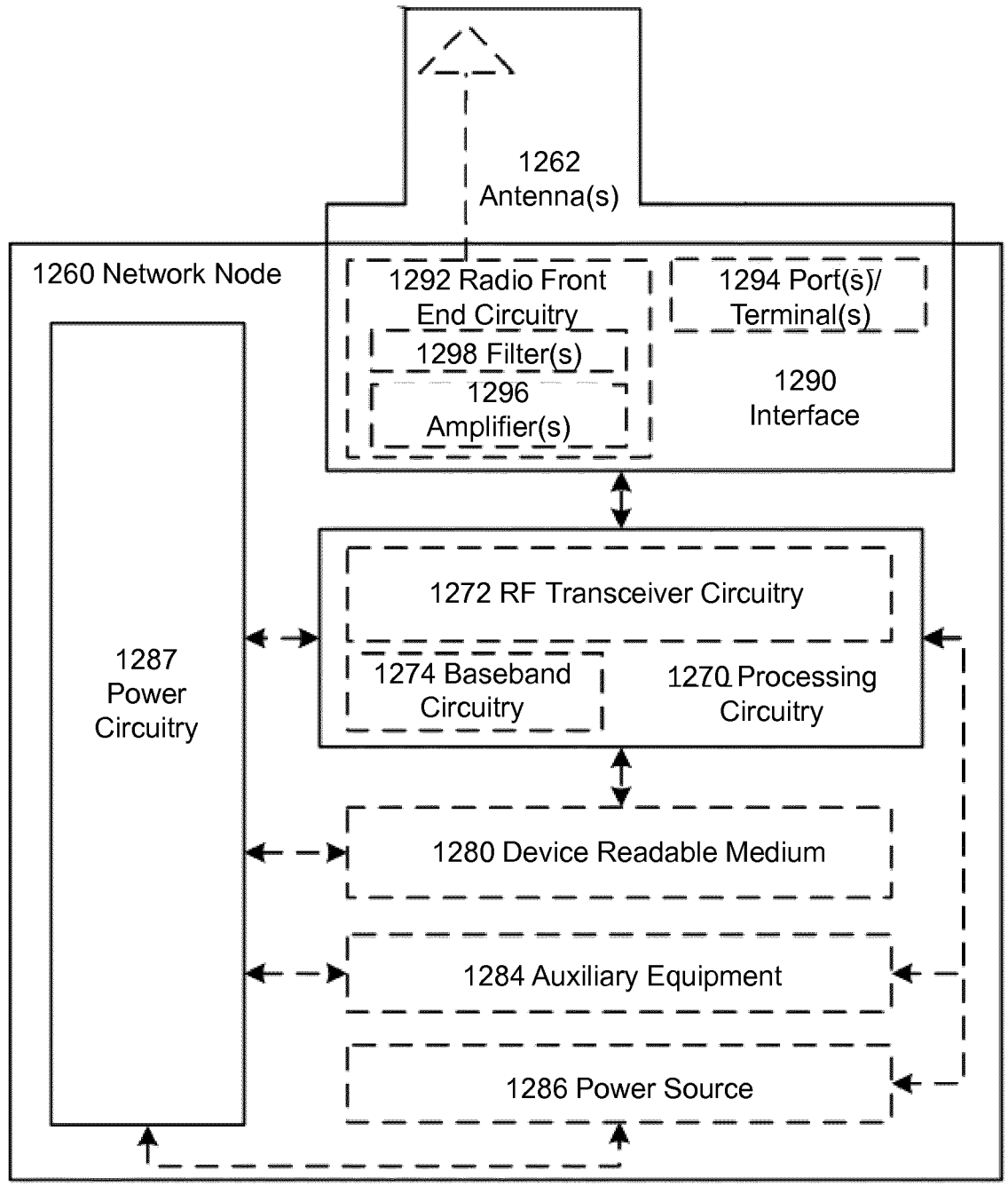
FIG. 14 illustrates an example network node, according to certain embodiments.

FIG. 14 illustrates an example network node 1260, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 14, network node 1260 includes processing circuitry 1270, device readable medium 1280, interface 1290, auxiliary equipment 1284, power source 1286, power circuitry 1287, and antenna 1262. Although network node 1260 illustrated in the example wireless network of FIG. 14 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1260 are depicted as single boxes located within a larger box, or nested within multiple boxes, in practice, a network node may comprise multiple different physical components that make up a single illustrated component (e.g., device readable medium 1280 may comprise multiple separate hard drives as well as multiple RAM modules).

Similarly, network node 1260 may be composed of multiple physically separate components (e.g., a NodeB component and a RNC component, or a BTS component and a BSC component, etc.), which may each have their own respective components. In certain scenarios in which network node 1260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1260 may be configured to support multiple radio access technologies (RATs). In such embodiments, some components may be duplicated (e.g., separate device readable medium 1280 for the different RATs) and some components may be reused (e.g., the same antenna 1262 may be shared by the RATs). Network node 1260 may also include multiple sets of the various illustrated components for different wireless technologies integrated into network node 1260, such as, for example, GSM, WCDMA, LTE, NR, WiFi, or Bluetooth wireless technologies. These wireless technologies may be integrated into the same or different chip or set of chips and other components within network node 1260.

Processing circuitry 1270 is configured to perform any determining, calculating, or similar operations (e.g., certain obtaining operations) described herein as being provided by a network node. These operations performed by processing circuitry 1270 may include processing information obtained by processing circuitry 1270 by, for example, converting the obtained information into other information, comparing the obtained information or converted information to information stored in the network node, and/or performing one or more operations based on the obtained information or converted information, and as a result of said processing making a determination.

Processing circuitry 1270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1260 components, such as device readable medium 1280, network node 1260 functionality. For example, processing circuitry 1270 may execute instructions stored in device readable medium 1280 or in memory within processing circuitry 1270. Such functionality may include providing any of the various wireless features, functions, or benefits discussed herein. In some embodiments, processing circuitry 1270 may include a system on a chip (SOC).

In some embodiments, processing circuitry 1270 may include one or more of radio frequency (RF) transceiver circuitry 1272 and baseband processing circuitry 1274. In some embodiments, radio frequency (RF) transceiver circuitry 1272 and baseband processing circuitry 1274 may be on separate chips (or sets of chips), boards, or units, such as radio units and digital units. In alternative embodiments, part or all of RF transceiver circuitry 1272 and baseband processing circuitry 1274 may be on the same chip or set of chips, boards, or units.

In certain embodiments, some or all of the functionality described herein as being provided by a network node, base station, eNB or other such network device may be performed by processing circuitry 1270 executing instructions stored on device readable medium 1280 or memory within processing circuitry 1270. In alternative embodiments, some or all of the functionality may be provided by processing circuitry 1270 without executing instructions stored on a separate or discrete device readable medium, such as in a hard-wired manner. In any of those embodiments, whether executing instructions stored on a device readable storage medium or not, processing circuitry 1270 can be configured to perform the described functionality. The benefits provided by such functionality are not limited to processing circuitry 1270 alone or to other components of network node 1260 but are enjoyed by network node 1260 as a whole, and/or by end users and the wireless network generally.

Device readable medium 1280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1270. Device readable medium 1280 may store any suitable instructions, data or information, including a computer program, software, an application including one or more of logic, rules, code, tables, etc. and/or other instructions capable of being executed by processing circuitry 1270 and, utilized by network node 1260. Device readable medium 1280 may be used to store any calculations made by processing circuitry 1270 and/or any data received via interface 1290. In some embodiments, processing circuitry 1270 and device readable medium 1280 may be considered to be integrated.

Interface 1290 is used in the wired or wireless communication of signalling and/or data between network node 1260, network 1206, and/or WIRELESS DEVICEs 1210. As illustrated, interface 1290 comprises port(s)/terminal(s) 1294 to send and receive data, for example to and from network 1206 over a wired connection. Interface 1290 also includes radio front end circuitry 1292 that may be coupled to, or in certain embodiments a part of, antenna 1262. Radio front end circuitry 1292 comprises filters 1298 and amplifiers 1296. Radio front end circuitry 1292 may be connected to antenna 1262 and processing circuitry 1270. Radio front end circuitry may be configured to condition signals communicated between antenna 1262 and processing circuitry 1270. Radio front end circuitry 1292 may receive digital data that is to be sent out to other network nodes or WIRELESS DEVICEs via a wireless connection. Radio front end circuitry 1292 may convert the digital data into a radio signal having the appropriate channel and bandwidth parameters using a combination of filters 1298 and/or amplifiers 1296. The radio signal may then be transmitted via antenna 1262. Similarly, when receiving data, antenna 1262 may collect radio signals which are then converted into digital data by radio front end circuitry 1292. The digital data may be passed to processing circuitry 1270. In other embodiments, the interface may comprise different components and/or different combinations of components.

In certain alternative embodiments, network node 1260 may not include separate radio front end circuitry 1292, instead, processing circuitry 1270 may comprise radio front end circuitry and may be connected to antenna 1262 without separate radio front end circuitry 1292. Similarly, in some embodiments, all or some of RF transceiver circuitry 1272 may be considered a part of interface 1290. In still other embodiments, interface 1290 may include one or more ports or terminals 1294, radio front end circuitry 1292, and RF transceiver circuitry 1272, as part of a radio unit (not shown), and interface 1290 may communicate with baseband processing circuitry 1274, which is part of a digital unit (not shown).

Antenna 1262 may include one or more antennas, or antenna arrays, configured to send and/or receive wireless signals. Antenna 1262 may be coupled to radio front end circuitry 1290 and may be any type of antenna capable of transmitting and receiving data and/or signals wirelessly. In some embodiments, antenna 1262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1262 may be separate from network node 1260 and may be connectable to network node 1260 through an interface or port.

Antenna 1262, interface 1290, and/or processing circuitry 1270 may be configured to perform any receiving operations and/or certain obtaining operations described herein as being performed by a network node. Any information, data and/or signals may be received from a wireless device, another network node and/or any other network equipment. Similarly, antenna 1262, interface 1290, and/or processing circuitry 1270 may be configured to perform any transmitting operations described herein as being performed by a network node. Any information, data and/or signals may be transmitted to a wireless device, another network node and/or any other network equipment.

Power circuitry 1287 may comprise, or be coupled to, power management circuitry and is configured to supply the components of network node 1260 with power for performing the functionality described herein. Power circuitry 1287 may receive power from power source 1286. Power source 1286 and/or power circuitry 1287 may be configured to provide power to the various components of network node 1260 in a form suitable for the respective components (e.g., at a voltage and current level needed for each respective component). Power source 1286 may either be included in, or external to, power circuitry 1287 and/or network node 1260. For example, network node 1260 may be connectable to an external power source (e.g., an electricity outlet) via an input circuitry or interface such as an electrical cable, whereby the external power source supplies power to power circuitry 1287. As a further example, power source 1286 may comprise a source of power in the form of a battery or battery pack which is connected to, or integrated in, power circuitry 1287. The battery may provide backup power should the external power source fail. Other types of power sources, such as photovoltaic devices, may also be used.

Alternative embodiments of network node 1260 may include additional components beyond those shown in FIG. 14 that may be responsible for providing certain aspects of the network node's functionality, including any of the functionality described herein and/or any functionality necessary to support the subject matter described herein. For example, network node 1260 may include user interface equipment to allow input of information into network node 1260 and to allow output of information from network node 1260. This may allow a user to perform diagnostic, maintenance, repair, and other administrative functions for network node 1260.

Figure 15:
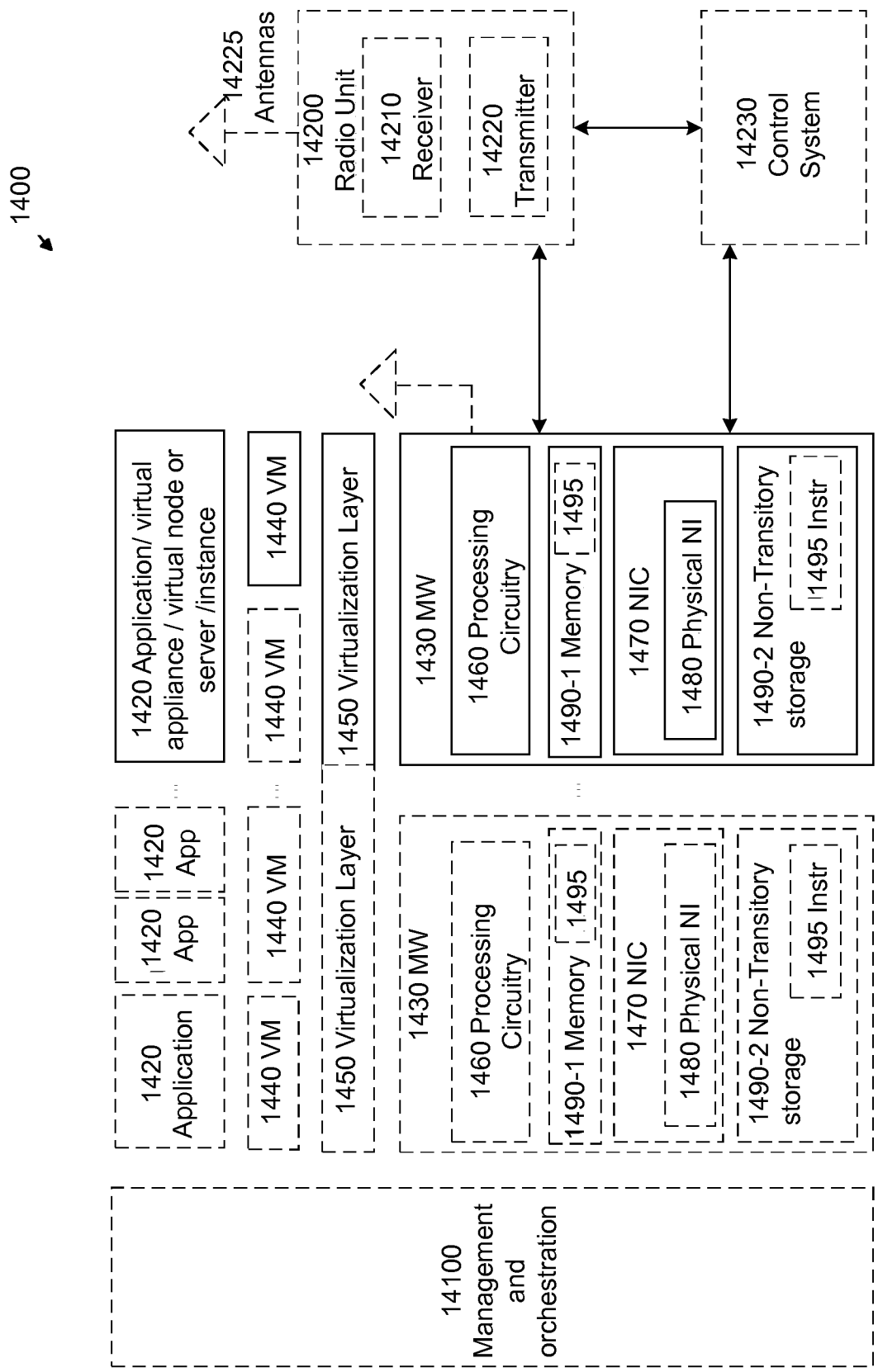
FIG. 15 illustrates a virtualization environment in which functions implemented by some embodiments may be virtualized, according to certain embodiments.

FIG. 15 is a schematic block diagram illustrating a virtualization environment 1400 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1400 hosted by one or more of hardware nodes 1430. Further, in embodiments in which the virtual node is not a radio access node or does not require radio connectivity (e.g., a core network node), then the network node may be entirely virtualized.

The functions may be implemented by one or more applications 1420 (which may alternatively be called software instances, virtual appliances, network functions, virtual nodes, virtual network functions, etc.) operative to implement some of the features, functions, and/or benefits of some of the embodiments disclosed herein. Applications 1420 are run in virtualization environment 1400 which provides hardware 1430 comprising processing circuitry 1460 and memory 1490. Memory 1490 contains instructions 1495 executable by processing circuitry 1460 whereby application 1420 is operative to provide one or more of the features, benefits, and/or functions disclosed herein.

Virtualization environment 1400, comprises general-purpose or special-purpose network hardware devices 1430 comprising a set of one or more processors or processing circuitry 1460, which may be commercial off-the-shelf (COTS) processors, dedicated Application Specific Integrated Circuits (ASICs), or any other type of processing circuitry including digital or analog hardware components or special purpose processors. Each hardware device may comprise memory 1490-1 which may be non-persistent memory for temporarily storing instructions 1495 or software executed by processing circuitry 1460. Each hardware device may comprise one or more network interface controllers (NICs) 1470, also known as network interface cards, which include physical network interface 1480. Each hardware device may also include non-transitory, persistent, machine-readable storage media 1490-2 having stored therein software 1495 and/or instructions executable by processing circuitry 1460. Software 1495 may include any type of software including software for instantiating one or more virtualization layers 1450 (also referred to as hypervisors), software to execute virtual machines 1440 as well as software allowing it to execute functions, features and/or benefits described in relation with some embodiments described herein.

Virtual machines 1440, comprise virtual processing, virtual memory, virtual networking or interface and virtual storage, and may be run by a corresponding virtualization layer 1450 or hypervisor. Different embodiments of the instance of virtual appliance 1420 may be implemented on one or more of virtual machines 1440, and the implementations may be made in different ways.

During operation, processing circuitry 1460 executes software 1495 to instantiate the hypervisor or virtualization layer 1450, which may sometimes be referred to as a virtual machine monitor (VMM). Virtualization layer 1450 may present a virtual operating platform that appears like networking hardware to virtual machine 1440.

As shown in FIG. 15, hardware 1430 may be a standalone network node with generic or specific components. Hardware 1430 may comprise antenna 14225 and may implement some functions via virtualization. Alternatively, hardware 1430 may be part of a larger cluster of hardware (e.g. such as in a data center or customer premise equipment (CPE)) where many hardware nodes work together and are managed via management and orchestration (MANO) 14100, which, among others, oversees lifecycle management of applications 1420.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1440 may be a software implementation of a physical machine that runs programs as if they were executing on a physical, non-virtualized machine. Each of virtual machines 1440, and that part of hardware 1430 that executes that virtual machine, be it hardware dedicated to that virtual machine and/or hardware shared by that virtual machine with others of the virtual machines 1440, forms a separate virtual network elements (VNE).

Still in the context of NFV, Virtual Network Function (VNF) is responsible for handling specific network functions that run in one or more virtual machines 1440 on top of hardware networking infrastructure 1430 and corresponds to application 1420 in FIG. 15.

In some embodiments, one or more radio units 14200 that each include one or more transmitters 14220 and one or more receivers 14210 may be coupled to one or more antennas 14225. Radio units 14200 may communicate directly with hardware nodes 1430 via one or more appropriate network interfaces and may be used in combination with the virtual components to provide a virtual node with radio capabilities, such as a radio access node or a base station.

In some embodiments, some signaling can be affected with the use of control system 14230 which may alternatively be used for communication between the hardware nodes 1430 and radio units 14200.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
NFC Network Function Cloudification
CNF Cloud-native Network Function
NFCI Network Function Cloudification Infrastructure
NFV Network Function Virtualization
SLA Service Level Agreement: e.g. max arrival rate and max latency
CPU Central Processing Unit
QoS Quality of Service: e.g. latency, CPU usage level, memory usage level
VNF Virtual Network Function
VPA Vertical Pod Autoscaler
QoE Quality of Experience
SON Self-Organizing Networks
CapEx Capital Expenditures
OpEx Operational Expenditures
MNO Mobile Network Operator
HPA Horizontal Pod Autoscaler
FFD First Fit Decreasing
LDAP Lightweight Directory Access Protocol

The invention claimed is:

1. A method for performance modeling of a plurality of microservices, the method comprising:
deploying the plurality of microservices within a network, the plurality of microservices communicatively coupled to generate at least one service chain for providing at least one service;
based on a resource allocation configuration, determining an initial set of training data for the plurality of microservices within the network;
excluding at least a portion of data from the initial set of training data to generate a subset of training data; and
generating a Quality of Service (QoS) behaviour model based on the subset of the training data, wherein selecting the QoS behaviour model based on the set of training data, comprises:
testing a plurality of hypothesis functions for the plurality of microservices in a service chain;
selecting one of a plurality of hypothesis functions that has a highest goodness of fit and cross-validation results to the set of training data; and
training the QoS behaviour model to estimate at least one QoS metric.

2. The method of claim 1, wherein excluding the portion of data from the initial set of training data to generate the subset of training data comprises:
isolating resources of the plurality of microservices;
selecting one of the plurality of microservices;
assigning a maximum respective resource allocation configuration to each of a plurality of resources associated with the plurality of microservices;
determining a saturation point for the one of the plurality of microservices; and
excluding a saturation area associated with the saturation point from the initial set of training data when generating the subset of training data.

3. The method of claim 2, wherein the saturation point comprises a point when a quality of service associated with the one of the plurality of microservices starts saturating while increasing resources.

4. A non-transitory computer-readable medium comprising computer program, the computer program comprising instructions which when executed on a computer perform the method of claim 1.

5. A network node for performance modeling of a plurality of microservices, the network node comprising:
processing circuitry configured to:
deploy the plurality of microservices within a network, the plurality of microservices communicatively coupling to generate at least one service chain for providing at least one service;
based on a resource allocation configuration, determine an initial set of training data for the plurality of microservices within the network;
exclude at least a portion of data from the initial set of training data to generate a subset of training data; and
generate a Quality of Service (QoS) behaviour model based on the subset of the training data, wherein when selecting the QoS behaviour model based on the set of training data the processing circuitry is configured to:
test a plurality of hypothesis functions for the plurality of microservices in a service chain;
select one of a plurality of hypothesis functions that has a highest goodness of fit and cross-validation results to the set of training data; and
train the QoS behaviour model to estimate at least one QoS metric.

6. The network node of claim 5, wherein when excluding the portion of data from the initial set of training data to generate the subset of training data the processing circuitry is configured to:
isolate resources of the plurality of microservices;
select one of the plurality of microservices;
assign a maximum respective resource allocation configuration to each of a plurality of resources associated with the plurality of microservices;
determine a saturation point for the one of the plurality of microservices; and
exclude a saturation area associated with the saturation point from the initial set of training data when generating the subset of training data.

7. The network node of claim 6, wherein the saturation point comprises a point when a quality of service associated with the one of the plurality of microservices starts saturating while increasing resources.

8. The network node of claim 6, wherein the processing circuitry is configured to repeat the steps of isolating, selecting, assigning, determining, and excluding for a randomly selected subset of the plurality of microservices.

9. The network node of claim 5, wherein the network comprises a lab environment, the lab environment comprising at least one infrastructure element, the at least one infrastructure element of the lab environment selected to emulate a production environment to minimize prediction errors.

10. The network node of claim 9, wherein a network topology of the lab environment emulates a network topology of the production environment.

11. The network node of claim 9, wherein the at least one infrastructure element comprises at least one of equipment, hardware, operating system, and bandwidth selected to emulate the production environment.

12. The network node of claim 5, wherein when deploying the plurality of microservices within the network the processing circuitry is configured to determine at least one network node to host each of the plurality of microservices.

13. The network node of claim 12, wherein a communication capacity of each of the plurality of microservices is considered when determining the at least one network node to host each of the plurality of microservices.

14. The network node of claim 13, wherein the plurality of microservices are hosted on a plurality of network nodes, each of the plurality of network nodes being selected to host at least one of the plurality of microservices based on at least one affinity rule or randomly.

15. The network node of claim 5, wherein when deploying the plurality of microservices within the network the processing circuitry is configured to minimize factors affecting QoS such that the resource allocation configuration is the only deterrent to getting a higher QoS value.

16. The network node of claim 5, wherein the processing circuitry is configured to use QoS behaviour models of the plurality of microservices to determine a value of the at least one QoS metric for the plurality of microservices in the service chain.

17. The network node of claim 5, wherein the processing circuitry is configured to:
use QoS behaviour models of the plurality of microservices to determine an optimal amount of resource capacities of each of the plurality of microservices belonging to the at least one service chain.

18. The network node of claim 17, wherein the optimal amount of resource capacities of each of the plurality of microservices is determined based on at least one QoS constraint for a user.

19. The network node of claim 5, wherein the QoS behaviour model of the plurality of microservices comprises a machine-learning model.

* * * * *